June 10, 1947.  W. C. STARKEY  2,421,814
ANTIKICKBACK CLUTCH
Filed June 18, 1943  2 Sheets-Sheet 1
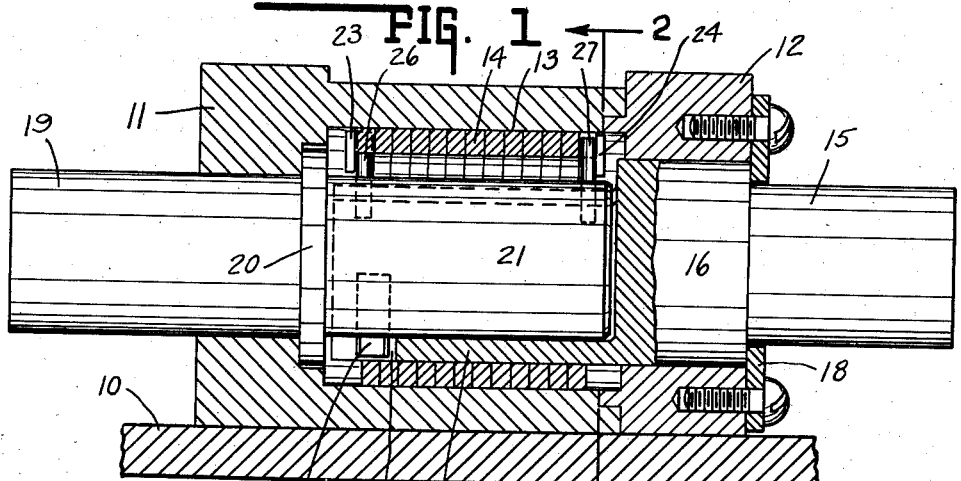
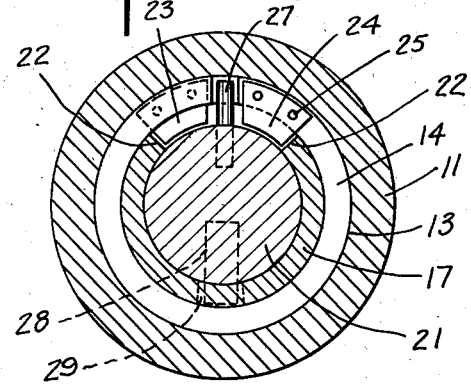
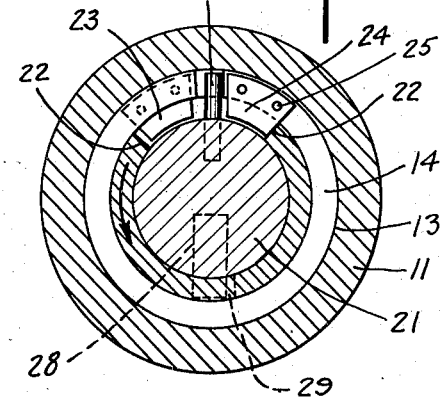
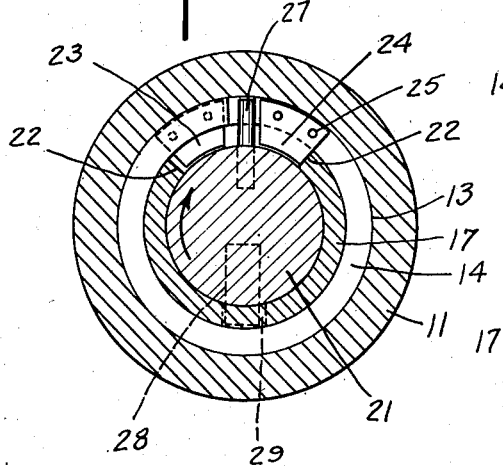
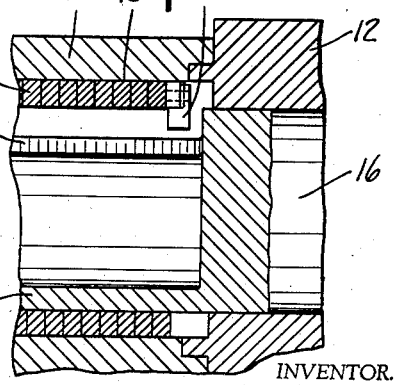
INVENTOR.
WILLIAM CARLETON STARKEY.
BY Lockwood, Goldsmith & Galt.
ATTORNEYS.

June 10, 1947.　　　　W. C. STARKEY　　　　2,421,814
ANTIKICKBACK CLUTCH
Filed June 18, 1943　　　　2 Sheets-Sheet 2
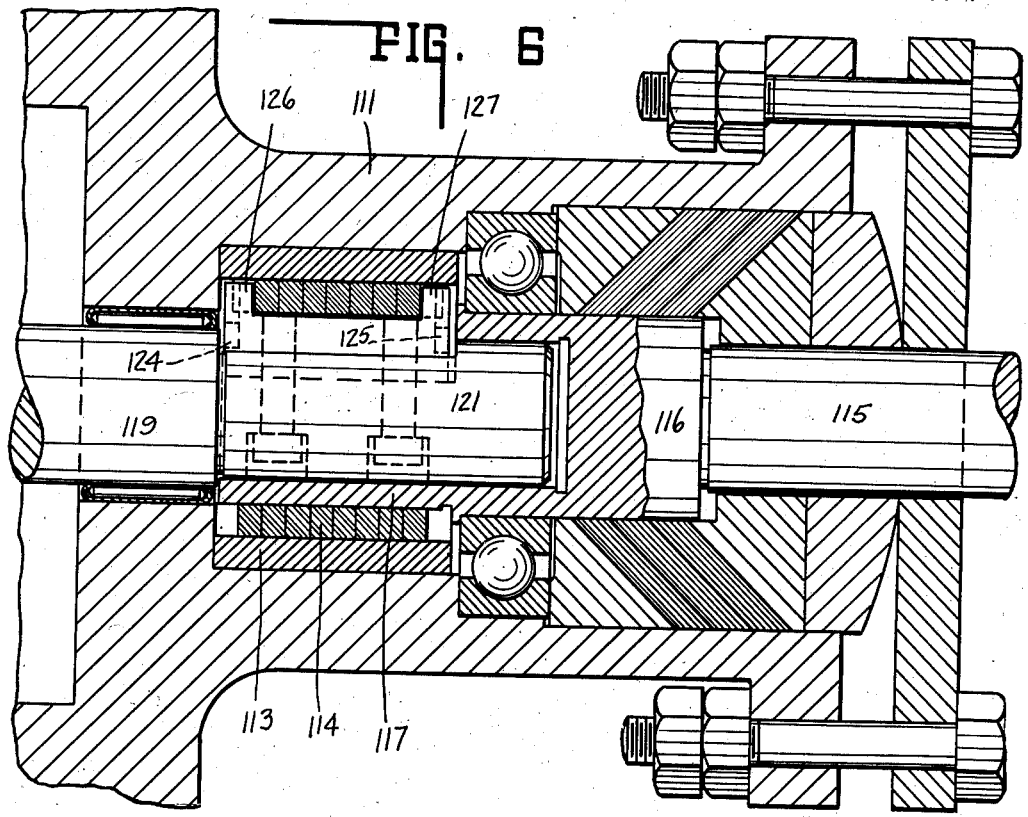
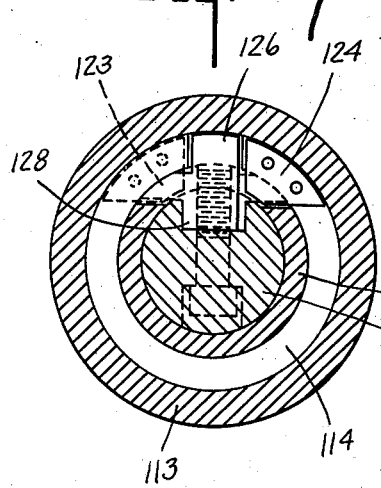
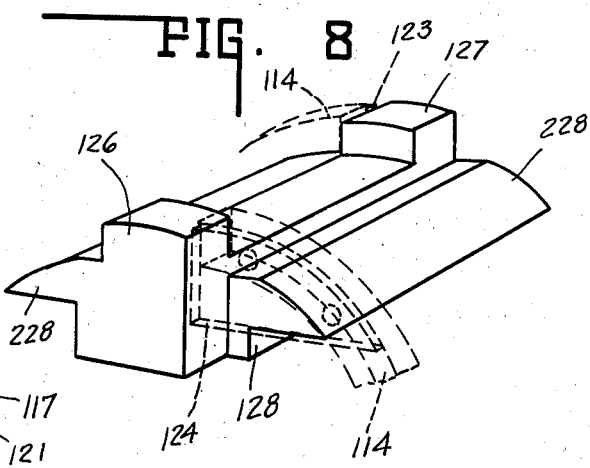
INVENTOR.
WILLIAM CARLETON STARKEY.
BY Lockwood, Goldsmith & Galt,
ATTORNEYS.

Patented June 10, 1947

2,421,814

UNITED STATES PATENT OFFICE 2,421,814

ANTIKICKBACK CLUTCH

William Carleton Starkey, Indianapolis, Ind., assignor, by mesne assignments, to Fletcher Trust Company, Indianapolis, Ind., a corporation of Indiana, as trustee Application June 18, 1943, Serial No. 491,301

8 Claims. (Cl. 192—8)

This invention relates to an anti-kickback clutch which may also be referred to as an irreversible clutch involving a clutch spring associated with driving and driven shafts so that the driven shaft is rotatable in either direction by the driving shaft, but is locked against rotation, when driving power is applied thereto, by the clutching action of the spring.

The invention particularly is advantageous when applied to vehicle steering mechanism, such as in heavy duty vehicles, where the kickback cannot be controlled by reduction gearing, and whereby the front wheels may be readily directed by the steering wheel, but, on the other hand, the steering wheel will not be affected by the impact or forces applied to the front wheels. Similarly, the invention is applicable to traversing mechanism for heavy guns, particularly when motorized. Thus, the traversing mechanism may be readily manipulated to lay the gun, but the inertia or weight of the gun on an incline, or impact thereof with an obstruction, will not impart movement to the traversing mechanism.

It is to be understood that this principle of utilizing a spring clutch to effect a locking against reverse movements, is well known in respect to automobile window regulators to prevent theft by directly pushing a window down, but it is to be noted that in such arrangement there was no requirement of a heavy duty clutch having close tolerances, whereby such arrangement is not applicable to heavy duty steering or traversing mechanisms. In such mechanisms it is essential to the proper functioning of the device that irrespective of the impact forces involved, the spring clutch must be free when operated from the driving shaft while instantaneously and positively clutching when actuated by the driven shaft. Thus, in laying a gun turret there must be no deviation from a given position by impact or otherwise.

This invention, therefore, as distinguished from clutches of this general character employed in automobile window regulators, involves the matter of maintaining close tolerances under tremendous power or impact. Thus, in laying a gun turret weighing several tons, the limit of tolerances within which the spring must lock and hold the gun in its laid position, is within three degrees, meaning for example, that with a prescribed gear ratio the gun may be held on target within approximately four minutes. There must be no increase developed in the tolerances due to wear, many and heavy impacts, or failure of the spring through breakage or distortion. Therefore, in order to meet this problem, this invention involves the feature of effecting the locking action of the spring by direct butt end engagement therewith by the driven member, to avoid the necessity of weakening the actuated portions of the spring or losing the required tolerances through bending. A further feature resides in the provision of lugs secured to the side walls of the spring adjacent its ends for activating them to declutching position by rotation of the driving member and finally effecting the driving action between the driving and driven members directly through a driving key connection instead of through the spring.

The full nature of the invention will be understood from the accompanying drawings and the following description and claims:

Fig. 1 is a central vertical section through the clutch showing the driven and driving shafts in elevation. Fig. 2 is a section taken on the line 2—2 of Fig. 1 showing the clutch in neutral position. Fig. 3 is the same as Fig. 2, showing the clutch in its driving position. Fig. 4 is the same as Fig. 2 showing the clutch in its locked position. Fig. 5 is a fragmental view showing a central vertical section of Fig. 1 with the driven shaft removed. Fig. 6 is a central vertical section through the clutch showing a modified form with the shafts in elevation. Fig. 7 is a section taken through the clutching elements of Fig. 6 with the housing removed. Fig. 8 is a perspective view of the clutch actuating member.

In the drawings there is shown a clutch assembly in Fig. 1 which is rigidly secured to a fixed support 10 and includes a housing 11 having a closure head 12 press fitted thereon. The housing 11 is provided with a pocket 13 which provides an internal cylindrical clutch surface for a clutch spring 14. Extending into one end of the housing through the head 12 there is a driving member comprising a driving shaft 15 which is provided with an enlarged head 16 milled out to form a sleeve 17. Said shaft is held in operative position by a locking ring 18 secured to the head 12, said ring embracing the shaft in engagement with the shoulder between the shaft and its head 16. A driven shaft 19 is formed with an enlarged collar 20 and a spindle 21 extending beyond the collar into the driving shaft sleeve 17, the collar 20 bearing against a shoulder in the housing 11 and the spindle 21 having a close bearing fit within the sleeve 17.

As shown in Fig. 5, the sleeve 17 is provided with a longitudinally extending slot 22 adapted to receive therein a pair of opposed spring actuating lugs 23 and 24. Said lugs are secured by rivets 25 or other suitable means to the exposed face of the end coil adjacent each end of the spring 14. By means of said lugs each end of the spring 14 is in interlocking engagement with the driving shaft sleeve. This is by reason of the lugs 23 and 24 extending inwardly from the spring into the cut away slot 22 of the sleeve for engagement thereby upon the driving shaft being rotated, for the purpose to be hereinafter described.

The spindle 21 of the driven shaft 19 is provided with a pair of radially extending spring engaging pins 26, 27. Said pins extend in the same longitudinal plane, but are located adjacent the opposite ends of the spindle 21 in position to engage the respective butt ends of the spring 14, for the purpose to be hereinafter described.

Said spindle 21 is further provided with a radially extending driving key 28 rigidly secured therein and extending into a slot 29 in the sleeve 17. However, it is to be noted that there is a substantial play between the key 28 and the side walls of the slot 29 in said sleeve, whereby a predetermined relative movement between the spindle and the sleeve is permitted before the key is engaged for driving action.

An important and essential feature of this invention resides in the tolerances or play between the key 28 in its slot 29, the lugs 23, 24 in respect to the slot 22 and the pins 26, 27 in respect to the butt ends of the clutch spring. This is for the purpose of permitting certain of these elements to be engaged and actuated before certain of the other elements are engaged and actuated in order that the clutch will properly operate.

The relation of the several actuating elements when in neutral position is shown in Fig. 2. In that position there is no rotative driving action developed in the driving shaft 15, and no impact developed in the driven shaft 19. In this position the lugs 23, 24 are centrally positioned with respect to the slot 22 in the sleeve, slightly spaced from its edges. The pins 26, 27 are slightly out of engagement and spaced from the butt ends of the spring 14. The key 28 is centrally positioned in respect to the slot 29 in the sleeve, equally spaced from its edges. The clutch spring is in bearing engagement with the inner surface of the pocket 13 of the housing under slight compression. In this respect the spring in its normal or inert state is of slightly larger diameter than the pocket so that when it is installed therein, it is under slight compression and in frictional engagement. In the driving action, as illustrated in Fig. 3, rotative force is applied to the shaft 15 as by a steering wheel or traversing mechanism. As said shaft 15 is rotated, rotating the sleeve 17 in the direction of the arrow of Fig. 3, the first action that takes place in respect to the several elements above mentioned, is that the cut away portion 22 of the sleeve engages the lug 24 and imparts a rotative movement thereto. Since the lug 24 is secured adjacent the end of the clutch spring it winds or wraps down the spring which frees it from clutching engagement with the surface of the pocket. This action, therefore, releases the spring from its clutching engagement with the fixed housing so that it is free to rotate therein. Its movement and action is necessarily effective to release the clutch before the spring reaches the pin 27 and before the key 28 is engaged by the sleeve. Therefore, there must be sufficient tolerance or free play between the pin 27 and the butt end of the spring and between the key 28 and its slot to permit not only engagement of the lug 24 by the sleeve, but sufficient movement to wrap down the spring and release it from clutching engagement. Thereupon the key 28 comes into action for directly driving the spindle 21 and driven shaft 19. The continued rotating movement of the shaft thereby imparts corresponding rotative movement to the driven shaft through the key 28 independently of the spring.

Similarly, the same action takes effect upon a reverse movement of the driving shaft 15, the reverse movement causing the lug 23 to be engaged by the sleeve to wrap down the spring to free it from the pocket and drive the driven shaft in the opposite direction through said key 28. For that reason it is necessary to have the two lugs so related as to cause the wrapping down and declutching of the spring by rotation in either direction of the driving shaft. During this action of the driving shaft the pins 26, 27 are ineffective, but have free play between the respective butt ends of the spring.

It, therefore, will be noted that it is important that the spacing or tolerances between these elements be critically related so that the lugs 23, 24 will first be engaged and the spring wrapped down before the key 28 becomes effective for driving the driven shaft, and throughout its action the pins 26, 27 will not effectively engage the butt ends of the spring.

Fig. 4 is illustrative of the position of the respective actuating elements when the driven shaft 19 is under impact, the action being to prevent transmission of movement thereby to the driving shaft. This is effected by the interlocking clutching action of the spring. For example, if the driven shaft receives an impact such as to rotate it in the direction of the arrow in Fig. 4, before rotative movement can be imparted by the spindle 21 to the driving shaft through the key 28, and within the free play of the key 28, the pin 27 is brought into engagement with the butt end of the spring. The impact of the pin 27 against the end of the spring is such as to unwrap the spring to extend it into clutching engagement within the clutching surface of the pocket so that the spring becomes non-rotative and is interlocked with the fixed housing and the spindle on the driven shaft. Therefore, no further movement of the driven shaft is permitted by reason of the clutching action of the spring, and there can be no kickback or reversible movement imparted thereby to the driving shaft. Obviously, wherein the driven shaft may have an impact such as to rotate it in the opposite direction, the opposed pin 26 will be moved into engagement with its associated butt end of the spring to correspondingly unwrap it into expanded clutching engagement with the fixed housing.

From the foregoing it will be noted that the tolerances and play of the actuating elements are required to be such as to take precedence over each other in the following order. In the driving action, (1) lugs 23, 24 are first actuated; (2) driving key 28 thereafter takes hold in its slot 29; and (3) pins 26, 27 are out of operative engagement by the ends of the spring, the key first taking hold. In the kickback action, (1) the pins 26, 27 first engage their respective butt ends of the spring to expand and clutch it; and (2) neither the key 28 nor the lugs 23, 24 are effectively engaged during this clutching action. By reason of the driving impact between the pins and the butt ends of the spring, a predetermined close tolerance is obtainable, such as within the three degrees requirement of a gun traversing mechanism, which tolerance remains established through continued use, since only a direct compressive action on the ends of the spring is involved as distinguished from a bending moment or distortion wherein the ends of the spring may be bent inwardly.

In the modified form of the invention shown in Figs. 6, 7 and 8, the actuating elements comprising the pins 26, 27, as well as the driving key 28, are embodied in one unitary structure shown in Fig. 8. Thus, this unitary structure embodies the outwardly projecting pins 126, 127, corresponding to the pins 26, 27 above described. It also embodies the driving key 128 corresponding to the above-described driving key 28. This unit is mounted within the spindle so that the intermediate coils of the spring lie between the two pins 126, 127, surrounding the wings 228 of the key 128, the butt ends of the spring lying in the plane of said pins respectively as illustrated in Fig. 7. The lugs 123, 124 are similarly riveted or otherwise secured to the side walls of the spring adjacent each end thereof with their lower edge at a predetermined distance below the bottom face of the wings 228. The key 128 is firmly locked in a recess formed in the spindle 121 on the shaft 119, said spindle being rotatably mounted within the sleeve 117 of the driving shaft 115. The unit of Fig. 8 or key 128 may be secured in said spindle by suitable transverse bolts so as to be rigid therewith. The spring 114 lies in clutching relation to the bushing 113 which is press fitted within the housing 111.

The tolerances in this construction are similar to those above described wherein the clutch is locked to prevent any kickback movement within three degrees by the corresponding defined relation between the position of the pins 126, 127 and their respective butt ends of the spring. The lugs 123, 124 have their lower edges so spaced from the bottom surface of the wings 228 that they will be first engaged by the edges of the slot in the sleeve, as above mentioned, to unwrap or declutch the spring and free it just prior to engagement with the undersurface of the wings of the key 128. Thus the spring will first be declutched and then the driving action will be imparted from the sleeve through the wings of the key to the spindle.

The invention claimed is:

1. In a clutch device, a fixed cylindrical element to provide a clutch engaging surface, a spiral clutch spring concentrically mounted with respect to said element for frictionally engaging said clutch surface, a pair of rotative members concentrically mounted with respect to each other and said spring, actuating lugs secured to said spring adjacent but spaced from each end thereof respectively and extending into the path of movement of one of said members for actuation thereby in either direction to force said spring out of clutching engagement with said element, and a unitary actuating element associated with said members and spring having a pair of spaced projections extending adjacent each end of said spring in the path of its winding, positioned for one of said projections to directly engage the adjacent butt end thereof upon rotative movement of the other of said members to force said spring into clutching engagement with said element by direct compressive action thereon, said unitary actuating element being effective to interconnect said members to transmit rotative movement from one to the other upon said spring being released from said element, whereby one of said rotative members will act to release said spring to permit free rotative movement thereof and the other of said rotating members will act to effect the clutching of said spring to said first element for providing rotative movement of said members.

2. In a clutch device, a driving member and an interconnecting driven member extending one within the other, a fixed housing having a cylindrical pocket therein surrounding and spaced from said members, a spirally wound clutch spring surrounding said members and normally in frictional engagement with said housing, actuating lugs secured to said spring adjacent each end thereof extending into the path of movement of the driving member for actuation thereby in either direction to wrap down said spring and release it from clutching engagement with said housing, and a pair of spaced projections actuated by said driven member and extending adjacent each butt end of said spring radially into the path of its winding and positioned for one of said projections to expand said spring into clutching engagement with said housing by direct compressive action against the butt end thereof.

3. In a clutch device, a driving member and a driven member extending one within the other, a fixed housing having a cylindrical pocket therein surrounding and spaced from said members, a spirally wound clutch spring surrounding said members and normally in frictional engagement with said housing, actuating lugs secured to said spring adjacent but spaced from each end thereof respectively and extending into the path of movement of the driving member for actuation thereby in either direction to wrap down said spring and release it from clutching engagement with said housing, a driving key mounted in said members operable to effect a driving connection therebetween after release of said spring from its clutching engagement, and a pair of spaced pins mounted on said driven member to project in direct line with the winding of each end of said spring, whereby upon rotative movement of said driven member one of said pins will directly engage the butt end of said spring for expanding it into clutching engagement with said housing by direct compressive action thereon.

4. In a clutch device, a driving sleeve having a longitudinal slot formed therein, a driven spindle extending into said sleeve, a fixed housing having a cylindrical pocket therein surrounding and spaced from said sleeve, a spirally wound clutch spring surrounding said sleeve and normally in frictional engagement with said housing, actuating lugs secured to said spring adjacent each end thereof and extending into said slot for actuation by said sleeve upon rotative movement thereof to wrap down said spring for release from said housing, and a pair of spaced projections actuated by rotative movement of said spindle, independently of said sleeve, said projections extending adjacent each end of said spring and positioned for one of said projections to engage the adjacent butt end thereof to expand it into clutching engagement with said housing by direct compressive action thereof.

5. In a clutch device, a driving sleeve having a longitudinal slot formed therein, a driven spindle extending into said sleeve, a fixed housing having a cylindrical pocket therein surrounding and spaced from said sleeve, a spirally wound clutch spring surrounding said sleeve and normally in frictional engagement with said housing, actuating lugs secured to said spring adjacent each end thereof and extending into said slot for actuation by said sleeve upon rotative movement thereof to wrap down said spring for release from said housing, a driving key extending into said sleeve and spindle operable to effect a driving connection therebetween after release of said spring from clutching engagement, and a pair of spaced pins extending outwardly from said spindle adjacent each end of said spring positioned for one of said pins to engage its adjacent butt end upon rotative movement of said spindle independently of said sleeve to expand said spring into clutching engagement with said housing by direct compressive action thereon.

6. In a clutch device, a driving sleeve having a longitudinal slot formed therein, a driven spindle extending into said sleeve, a fixed housing having a cylindrical pocket therein surrounding and spaced from said sleeve, a spirally wound clutch spring surrounding said sleeve and normally in frictional engagement with said housing, actuating lugs secured to said spring adjacent each end thereof and extending into said slot for actuation by said sleeve upon rotative movement thereof to wrap down said spring for release from said housing, and a unitary actuating element secured to said spindle and engageable by said sleeve to drive said spindle after release of said spring from clutching engagement, said unitary actuating element having a pair of spaced projections extending upwardly therefrom adjacent each end of said spring positioned for one of said projections to engage its adjacent butt end upon rotative movement of said spindle independently of said sleeve to expand said spring into clutching engagement with said housing by direct compressive action thereon.

7. In a clutch device, a driving sleeve having a longitudinal slot formed therein, a driven spindle extending into said sleeve, a fixed housing having a cylindrical pocket therein surrounding and spaced from said sleeve, a spirally wound clutch spring surrounding said sleeve for frictional clutching engagement with said housing, actuated lugs secured to said spring adjacent each end thereof extending into position for actuating engagement by said sleeve upon rotative movement thereof to wrap down said spring free of said pocket, and a pair of spaced projections actuated by rotative movement of said spindle, independently of said sleeve, said projections extending through said slot adjacent each end of said spring positioned for one of said projections to engage the adjacent end thereof out of contact with said adjacent actuating lug to expand it into clutching engagement with said sleeve.

8. The combination of an inner driven member and an outer driving member mounted in telescopic relation to each other, key forming means between the inner perimeter of the outer member and the outer perimeter of the inner member for providing a delayed action through driving connection between said members, means providing a fixed clutch surface encircling said members, a spring clutch movable into and out of frictional clutching engagement with said surface, the outer driving member being provided with a slot in spaced relation to said key forming means, and an outstanding finger on said inner driven member extended freely into said slot, said finger being normally spaced from and adapted on relative rotation of the members to move into engagement with said clutch spring to effect its clutching engagement with said clutch surface.

WILLIAM CARLETON STARKEY.

REFERENCES CITED

The following references are of record in the file of this patent:

UNITED STATES PATENTS

| Number | Name | Date |
|---|---|---|
| 1,849,902 | Ackerman et al. | Mar. 15, 1932 |
| 2,001,758 | Zwierzina | May 21, 1935 |